(12) United States Patent
So et al.

(10) Patent No.: US 11,993,107 B2
(45) Date of Patent: May 28, 2024

(54) TIRES WITH SELF GENERATION AND SOUND ABSORPTION

(71) Applicant: HANKOOK TIRE & TECHNOLOGY CO., LTD, Seongnam-si (KR)

(72) Inventors: Soon Hong So, Daejeon (KR); Chang Hyo Hong, Daejeon (KR); Jung Hee Choi, Seoul (KR)

(73) Assignee: HANKOOK TIRE & TECHNOLOGY CO., LTD, Seongnam-si (KR)

( * ) Notice: Subject to any disclaimer, the term of this patent is extended or adjusted under 35 U.S.C. 154(b) by 439 days.

(21) Appl. No.: 17/173,698

(22) Filed: Feb. 11, 2021

(65) Prior Publication Data

US 2021/0252920 A1     Aug. 19, 2021

(30) Foreign Application Priority Data

Feb. 17, 2020 (KR) .................. 10-2020-0019163

(51) Int. Cl.
| | |
|---|---|
| B60C 23/04 | (2006.01) |
| B60C 19/00 | (2006.01) |
| H02J 50/00 | (2016.01) |

(52) U.S. Cl.
CPC ........ B60C 23/0411 (2013.01); B60C 19/002 (2013.01); H02J 50/001 (2020.01)

(58) Field of Classification Search
CPC ........... B60C 19/002; B60C 2019/004; B60C 23/0411; B60C 23/0493; H02J 50/001
See application file for complete search history.

(56) References Cited

U.S. PATENT DOCUMENTS

| | | |
|---|---|---|
| 9,178,446 B2 | 11/2015 | Fan et al. |
| 2015/0035408 A1 | 2/2015 | Boisseau et al. |

FOREIGN PATENT DOCUMENTS

| | | | |
|---|---|---|---|
| DE | 102015217472 A1 | * | 3/2017 |
| DE | 102018208459 A1 | * | 12/2019 |
| KR | 10-1887809 B1 | | 8/2018 |
| KR | 10-1957990 B1 | | 3/2019 |
| KR | 102127660 B1 | * | 6/2020 |

OTHER PUBLICATIONS

KR102127660B1 machine translation (Year: 2020).*
DE 102015217472 Machine Translation (Year: 2017).*
DE 102018208459 Machine Translation (Year: 2019).*

* cited by examiner

*Primary Examiner* — Justin R Fischer
*Assistant Examiner* — Wendy L Boss
(74) *Attorney, Agent, or Firm* — Bridgeway IP Law Group, PLLC; Jihun Kim

(57) ABSTRACT

Proposed is a tire with self-generation and sound absorption and, more particularly, is a tire with self-generation and sound absorption that operates an electronic module through self-power generation and has improved sound absorption performance. The tire with self-generation and sound absorption includes: a wall structure formed on a surface of an inner liner of the tire; a sound absorber spaced apart upward from the inner liner with both ends coupled to the wall structure and blocking sound generated by surfaces of treads and a road surface; and an electronic unit disposed on the surface of the inner liner and positioned between the inner liner and the sound absorber.

11 Claims, 3 Drawing Sheets

TIRES WITH SELF GENERATION AND SOUND ABSORPTION

BACKGROUND OF THE INVENTION

Field of the Invention

The present disclosure relates to a tire with self-generation and sound absorption and, more particularly, to a tire with self-generation and sound absorption that operates an electronic module through self-power generation and has improved sound absorption performance.

Description of the Related Art

A technology that attaches a sound absorption material to a tire to reduce noise from the surface of the treads of a tire or a road surface has been increasingly developed.

In particular, a technology that directly attaches a sponge type sound absorption material to the inner liner of a tire using an adhesive has been used.

However, when the adhesive is used, there is a problem that precise control is difficult because the adhesive is liquid.

Further, when a sealant is used, there is a problem that it is required to maintain the temperature of a discharge nozzle at a high level and that precise control is difficult because the sealant is also liquid.

In particular, when an adhesive is used and pressure is applied, a foam absorbs the pressure, so pressure is not transmitted to the adhesive. In this case, the adhesive ability is not sufficiently exerted, so the sound absorption material may be separated in use.

Further, there is another problem that the adhesive performance is significantly deteriorated due to hardening and aging of the adhesive.

Accordingly, a tire having a sound absorption material fixing band was developed in the related art. Such a tire is manufactured by vulcanizing a band for fixing the sound absorption material to the tire and the sound absorption material is inserted between the band and the inner liner, but there is a problem that the sound absorption material is easily separated.

Further, although it is possible to further fix the sound absorption material using an adhesive in order to solve this problem, when an adhesive is used and the adhesive strength is decreased by aging or hardening, the sound absorption material may be easily separated.

On the other hand, there is a technology of inserting wires in a sound absorption material and generating power. However, according to this technology, since the sound absorption material is disposed on the entire surface and the wires are also inserted in the entire surface, whereby the weight of the tire greatly increases.

For example, when the circumference of a tire is 2 m, the weight of a sound absorption material is usually around 400 g, but when wires for self-power generation are added, there is a problem that the weight increases by up to 1.7 kg.

CITATION LIST

Patent Literature

Patent Literature 1: Korean Patent No. 10-1887809

SUMMARY OF THE INVENTION

The present disclosure has been made in an effort to solve the problems and an objective of the present disclosure is to provide a tire with self-generation and sound absorption that operates an electronic module through self-power generation and has improved sound absorption performance.

The objectives to implement in the present disclosure are not limited to the technical problems described above and other objects that are not stated herein will be clearly understood by those skilled in the art from the following specifications.

In order to achieve the objectives of the present disclosure, the tire with self-generation and sound absorption of the present disclosure includes: a wall structure formed on a surface of an inner liner of the tire; a sound absorber spaced apart upward from the inner liner with both ends coupled to the wall structure and blocking sound generated by surfaces of treads and a road surface; and an electronic unit disposed on the surface of the inner liner and positioned between the inner liner and the sound absorber.

In an embodiment of the present disclosure, the wall structure includes: a pair of bodies attached or coupled to the inner liner; and insertion grooves formed in the bodies to have ends of the sound absorber inserted and fixed therein.

In an embodiment of the present disclosure, the bodies are made of a porous sponge to perform a sound absorption function.

In an embodiment of the present disclosure, the bodies are made of a polyurethane sponge or a porous expandable polymer-based material.

In an embodiment of the present disclosure, the wall structure further includes first wires disposed in apertures of the bodies, and the first wires generate electrical energy through frictional electrification with the bodies having a porous sponge structure.

In an embodiment of the present disclosure, the first wires are formed by printing a conductive material.

In an embodiment of the present disclosure, the sound absorber includes: a polymer film type sound absorption member; and couplers formed at both ends of the sound absorption member to be coupled to the wall structure.

In an embodiment of the present disclosure, the sound absorber further includes second wires disposed in the couplers, and the second wires generate electrical energy through frictional electrification with the bodies having a porous sponge structure.

In an embodiment of the present disclosure, the second wires are formed by printing a conductive material.

In an embodiment of the present disclosure, the electronic unit includes: an electronic module having a sensor measuring a state of the tire; and a power supplying power to the electronic module.

In an embodiment of the present disclosure, both ends of the sound absorber are inserted by a first length in the wall structure, and sections corresponding to a second length, which is smaller than the first length, from both ends inserted in the wall structure are formed thicker than other inserted sections.

In an embodiment of the present disclosure, the insertion grooves are formed with steps to correspond to both ends of the sound absorber.

DETAILED DESCRIPTION OF THE PREFERRED EMBODIMENTS

Figure 1:
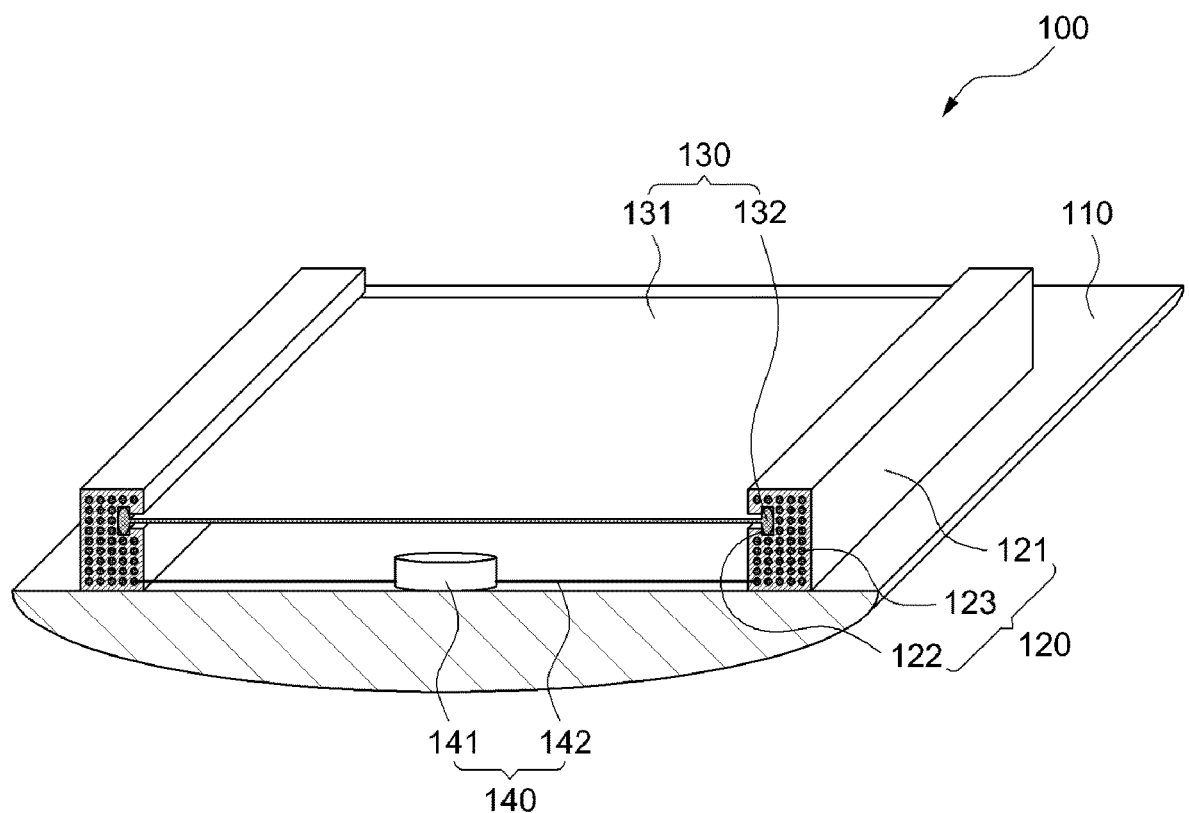
FIG. 1 is a perspective view of a tire with self-generation and sound absorption according to an embodiment of the present disclosure.

Hereinafter, the present disclosure is described with reference to the accompanying drawings. However, the present disclosure may be modified in various different ways and is not limited to the embodiments described herein. Further, in the accompanying drawings, components irrelevant to the description will be omitted in order to obviously describe the present disclosure, and similar reference numerals will be used to describe similar components throughout the specification.

Throughout the specification, when an element is referred to as being "connected with (coupled to, combined with, in contact with)" another element, it may be "directly connected" to the other element and may also be "indirectly connected" to the other element with another element intervening therebetween. Further, unless explicitly described otherwise, "comprising" any components will be understood to imply the inclusion of other components rather than the exclusion of any other components.

Terms used in the present disclosure are used only in order to describe specific exemplary embodiments rather than limiting the present disclosure. Singular forms are intended to include plural forms unless the context clearly indicates otherwise. It will be further understood that the terms "comprises" or "have" used in this specification specify the presence of stated features, numbers, steps, operations, components, parts, or a combination thereof, but do not preclude the presence or addition of one or more other features, numbers, steps, operations, components, parts, or a combination thereof.

Hereinafter, embodiments of the present disclosure are described in detail with reference to the accompanying drawings.

Figure 2:
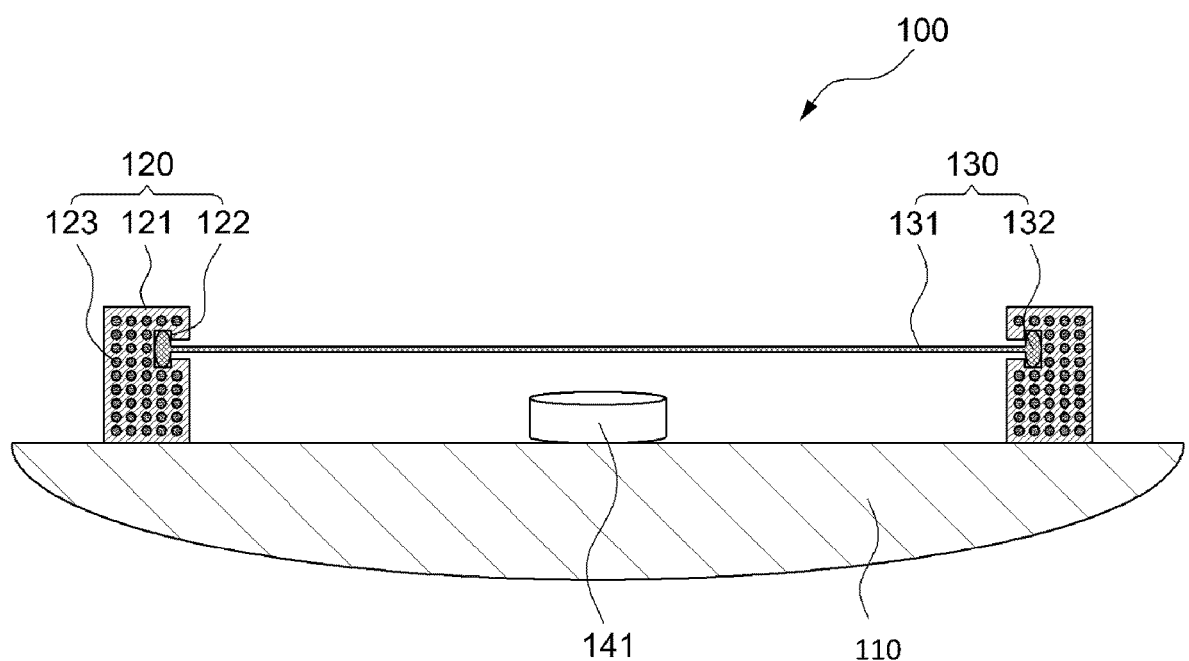
FIG. 2 is a cross-sectional view of the tire with self-generation and sound absorption according to an embodiment of the present disclosure.

FIG. 1 is a perspective view of a tire with self-generation and sound absorption according to an embodiment of the present disclosure, and FIG. 2 is a cross-sectional view of the tire with self-generation and sound absorption according to an embodiment of the present disclosure.

Figure 3:
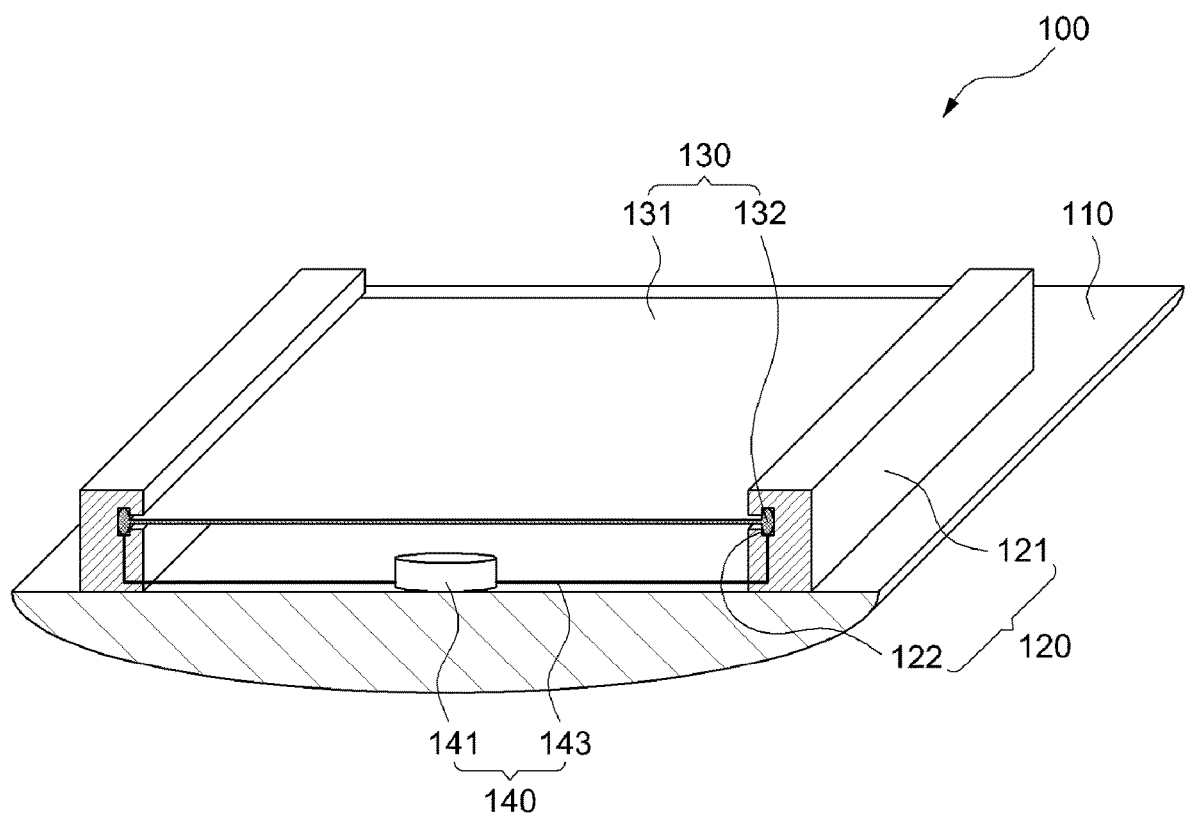
FIG. 3 is an exemplary view showing second wires of the tire with self-generation and sound absorption according to an embodiment of the present disclosure.
Figure 4:
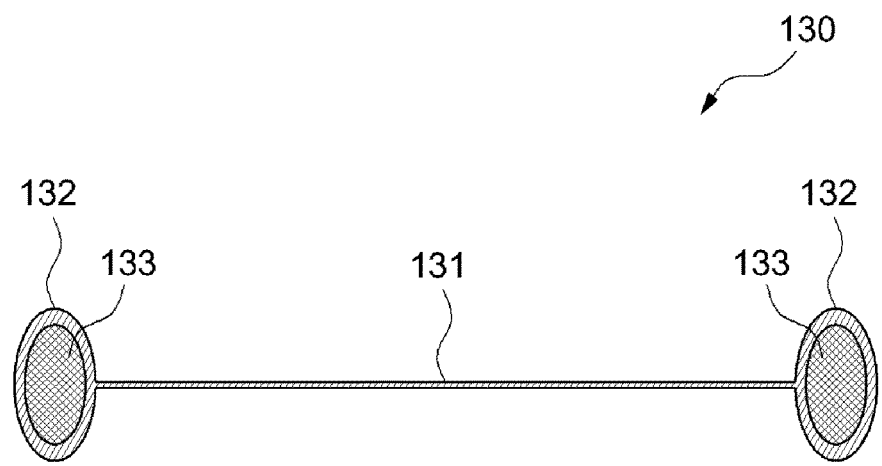
FIG. 4 is a cross-sectional view showing a sound absorber of the tire with self-generation and sound absorption according to an embodiment of the present disclosure.

FIG. 3 is an exemplary view showing second wires of the tire with self-generation and sound absorption according to an embodiment of the present disclosure, and FIG. 4 is a cross-sectional view showing a sound absorber of the tire with self-generation and sound absorption according to an embodiment of the present disclosure.

As shown in FIGS. 1 to 4, a tire with self-generation and sound absorption includes an inner liner 110, a wall structure 120, a sound absorber 130, and an electronic unit 140.

The wall structure 120 may be formed on the surface of the inner liner 110 of the tire and includes bodies 121, insertion grooves 122, and first wires 123.

The bodies 121 may be attached or coupled to the top of the inner liner 110. The body 121 may be attached to the inner liner using a super glue, a sealant, a PSA type adhesive, etc.

The bodies 121 may be provided in a pair with a gap therebetween on the surface of the inner liner 110. The pair of bodies 121 may be disposed in parallel with each other.

The shape of the body 121 is not limited thereto and may be disposed to form a rectangle.

The bodies 121 may be made of a porous sponge to perform a sound absorption function.

In detail, the bodies 121 may be made of a polyurethane sponge or a porous expandable polymer-based material.

The insertion grooves 122 are formed at the bodies 121 such that ends of the sound absorber 130 is inserted and fixed therein.

The insertion grooves 122 may be provided such that the sound absorber 130 can be suspended to be structurally coupled with the ends inserted therein.

The first wires 123 may be disposed in apertures in the bodies 121.

The first wires 123 may generate electrical energy through frictional electrification with the bodies 121 having a porous sponge structure.

In detail, when the body 121 is moved, frictional electrification is generated between the body 121 and the first wires 123 inserted in the body 121 made of a porous sponge.

In more detail, when the apertures in the body 121 generate friction, static electricity is generated, and electrification occurs while the apertures are returned to the initial state. In this process, the same electrification also occurs between the first wires 123 in the apertures, whereby electrical energy is generated.

The apertures of the body 121 and the first wires 123 may be formed as many as possible to maximally generate electrical energy.

The wall structure 120 having this configuration can perform both of a sound absorption function and power generation function.

The first wires 123 may be common wires, but may be formed by printing a conductive material.

In detail, the first wires 123 may be formed by printing a conductive material in the apertures of the bodies 121.

The first wires 123 formed in this way can be reduced in weight in comparison to using common wires. When the weight is decreased as described above, it is possible to form more wires and to keep the bodies 121 stably attached to the inner liner 110.

The sound absorber 130 is spaced apart upward from the inner liner 110 with both ends coupled to the wall structure 120, thereby being able to block noise generated from the surfaces of treads and a road surface.

The sound absorber 130 includes a sound absorption member 131, couplers 132, and second wires 133.

The sound absorption member 131 may be provided in a polymer film type for absorbing a sound. The sound absorption member 131 is spaced apart upward from the inner liner 110, whereby an air layer may be formed between the sound absorption member 131 and the inner liner 110. The sound absorption member 131 can further reduce noise by blocking noise transmitted through the air layer.

The couplers 132 may be formed at both ends of the sound absorption member 131 to be coupled to the wall structure 120.

In more detail, both ends of the sound absorber 130 may be inserted by a first length in the insertion grooves 122 formed in the wall structure 120. The sections corresponding to a second length, which is smaller than the first length, from both ends inserted in the wall structure 120 may be formed thicker than other inserted sections.

The sections corresponding to the second length are the couplers 132, and the couplers 132 may be thicker than the sound absorption member 131 inserted in the bodies 121.

The insertion grooves 122 may be formed with steps to correspond to both ends of the sound absorber 130.

That is, the insertion groove 122 may be formed as much as the thickness of the coupler 132 at a position where the coupler 132 is inserted, and formed as much as the thickness of the sound absorption member 131 at an area corresponding to a difference between the first length and the second length.

Due to these shapes of the insertion grooves 122 and the couplers 132, the sound absorber 130 can be coupled to the wall structure 120.

The combination of the couplers 122 and the insertion grooves 122 may be enhanced by applying an adhesive or a gluing agent.

According to the present disclosure, it is possible to stably fix the sound absorption member in comparison to the way of simply attaching a sound absorption member to an inner liner in the related art.

The second wires 133 may be disposed in the couplers 132 or may form the couplers 132 themselves.

The second wires 133 may generate electrical energy through frictional electrification with the bodies 121 having a porous sponge structure.

In detail, when the body 121 is moved, frictional electrification is generated between the body 121 and the second wires 133 inserted in the body 121 made of a porous sponge.

In more detail, when the apertures and the insertion grooves 122 formed in the body 121 generate friction, static electricity is generated, and electrification occurs while the apertures are returned to the initial state. In this process, the same electrification also occurs between the second wires 133 in the insertion grooves 122, whereby electrical energy is generated.

The sound absorber 130 having this configuration can perform both of a sound absorption function and power generation function.

The second wires 133 may be common wires, but may be formed by printing a conductive material.

In detail, the second wires 133 may be formed by printing a conductive material to the couplers 132.

The second wires 133 formed in this way can be reduced in weight in comparison to using common wires. When the weight is decreased as described above, it is possible keep the bodies 121 stably attached to the inner liner 110.

The electronic unit 140 may be disposed on the surface of the inner liner 110 and positioned between the inner liner 110 and the sound absorber 130.

The electronic unit 140 includes an electronic module 141, a first conducting wire 142, a second conducting wire 143, and a power.

The electronic module 141 may have a sensor that senses the state of the tire.

In detail, a pressure sensor that measures general pressure of the tire, a temperature sensor that measures temperature of the tire, and an acceleration sensor that measures deformation of the tire may be mounted in the electronic module 141, and a strain gauge, etc. may also be mounted.

A communication module may be further mounted in the electronic module 141 and the communication module can use a common radio frequency of Bluetooth communication.

The power may be a chargeable secondary battery and may include a rectifier circuit that converts a current generated through self-generation, a storage circuit including a capacitor that stores electrical energy, and a charging circuit that charges the battery.

The power having this configuration can be supplied with electrical energy generated by friction generation of the wall structure 120 and the sound absorber 130 and can supply power to the electronic module 141.

The first conducting wire 142 may connect the first wires 123 and the power and the second conducting wire 143 may connect the second wires 133 and the power.

When common wires are used for the first conducting wire 142 and the second conducting wire 143, it is possible to increase durability against fatigue by using stranding wires.

The first conducting wire 142 and the second conducting wire 143 may be formed by printing a conductive material to the inner liner 110, whereby the weight can be reduced.

As described above, the present disclosure is possible to perform self-generation and sound absorption, and also is economical as the weight can be reduced.

The present disclosure having the configuration described above has an effect that it is possible secure both of sound absorption and self-generation functions.

Further, a sound absorption material reducing the use area of a sponge and having a film type is used, and the wires and the conducting wires can be formed by printing a conductive material rather than using common wires, so the weight can be reduced.

Further, an electronic module power can be used through self-generation.

The effects of the present disclosure are not limited thereto and it should be understood that the effects include all effects that can be inferred from the configuration of the present disclosure described in the following specification or claims.

The above description is provided as an exemplary embodiment of the present disclosure and it should be understood that the present disclosure may be easily modified in other various ways without changing the spirit or the necessary features of the present disclosure by those skilled in the art. Therefore, the embodiments described above are only examples and should not be construed as being limitative in all respects. For example, the components described as a single part may be divided and the components described as separate parts may be integrated.

The scope of the present disclosure is defined by the following claims, and all of changes and modifications obtained from the meaning and range of claims and equivalent concepts should be construed as being included in the scope of the present disclosure.

What is claimed is:

1. A tire with self-generation and sound absorption, the tire comprising:
a wall structure disposed on a surface of an inner liner of the tire;
a sound absorber spaced apart upward from the inner liner with both ends coupled to the wall structure and configured for blocking sound generated by surfaces of treads and a road surface; and
an electronic unit disposed on the surface of the inner liner and positioned between the inner liner and the sound absorber,
wherein the wall structure includes:
a pair of bodies attached or coupled to the inner liner; and
insertion grooves formed in the bodies to have the both ends of the sound absorber inserted and fixed therein.

2. The tire of claim 1, wherein the bodies are made of a porous sponge to perform a sound absorption function.

3. The tire of claim 2, wherein the bodies are made of a polyurethane sponge or a porous expandable polymer-based material.

4. The tire of claim 2, wherein the wall structure further includes first wires disposed in apertures of the bodies, and the first wires are configured to generate electrical energy through frictional electrification with the bodies made of the porous sponge.

5. The tire of claim 4, wherein the first wires are formed by printing a conductive material.

6. The tire of claim 1, wherein the sound absorber includes:

a polymer film shaped sound absorption member; and couplers formed at both ends of the sound absorption member to be coupled to the wall structure.

7. A tire with self-generation and sound absorption, the tire comprising:

a wall structure disposed on a surface of an inner liner of the tire;

a sound absorber spaced apart upward from the inner liner with both ends coupled to the wall structure and configured for blocking sound generated by surfaces of treads and a road surface; and an electronic unit disposed on the surface of the inner liner and positioned between the inner liner and the sound absorber, wherein the sound absorber includes:

a polymer film shaped sound absorption member;

couplers formed at both ends of the sound absorption member to be coupled to the wall structure; and second wires disposed in the couplers, wherein the second wires are configured to generate electrical energy through frictional electrification with bodies having a porous sponge structure.

8. The tire of claim 7, wherein the second wires are formed by printing a conductive material.

9. The tire of claim 1, wherein the electronic unit includes:

an electronic module having a sensor configured for measuring a state of the tire; and a power module configured for supplying power to the electronic module.

10. The tire of claim 1, wherein the both ends of the sound absorber are inserted for a first length in the wall structure, and sections having a second length, which is shorter than the first length, extending from the both ends and inserted in the wall structure are formed thicker than other inserted sections of the sound absorber.

11. The tire of claim 10, wherein the insertion grooves are formed with steps to correspond to the both ends of the sound absorber.

* * * * *